(12) United States Patent
Suh

(10) Patent No.: US 8,619,216 B1
(45) Date of Patent: Dec. 31, 2013

(54) OPTICAL WAVELENGTH FILTER

(75) Inventor: Seong Woo Suh, Budd Lake, NJ (US)

(73) Assignee: INLC Technology, Inc., Gwangju (KR)

( * ) Notice: Subject to any disclaimer, the term of this patent is extended or adjusted under 35 U.S.C. 154(b) by 69 days.

(21) Appl. No.: 13/491,029

(22) Filed: Jun. 7, 2012

(51) Int. Cl.
*G02F 1/1335* (2006.01)

(52) U.S. Cl.
USPC .......................................... 349/104; 349/105

(58) Field of Classification Search
USPC ................................................ 349/104, 105
See application file for complete search history.

(56) References Cited

U.S. PATENT DOCUMENTS 7,822,303 B2    10/2010   Cohen et al.

*Primary Examiner* — Phu Vu
(74) *Attorney, Agent, or Firm* — Stein IP, LLC

(57) ABSTRACT

An optical wavelength selective device includes a waveguide grating unit to separate input beam signals with different wavelengths into a plurality of output beam signals, each of which has a different wavelength span and is output from a different channel region of the waveguide grating unit; a polarization splitting unit to split each of the output beam signals into a first polarized beam with a first polarization and a second polarized beam with a second polarization different from the first polarization; a birefringence control member to control the first polarized beam to undergo a different refractive effect than the second polarized beam when the first and second polarized beams pass through the birefringence control member under a first voltage applied thereto; and a reflection member configured to reflect the first and second polarized beams output from the birefringence control member back to the birefringence control member.

20 Claims, 4 Drawing Sheets

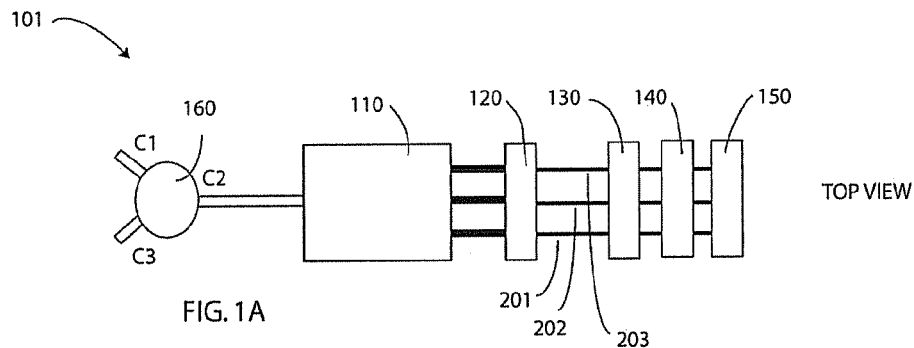
FIG. 1A  TOP VIEW
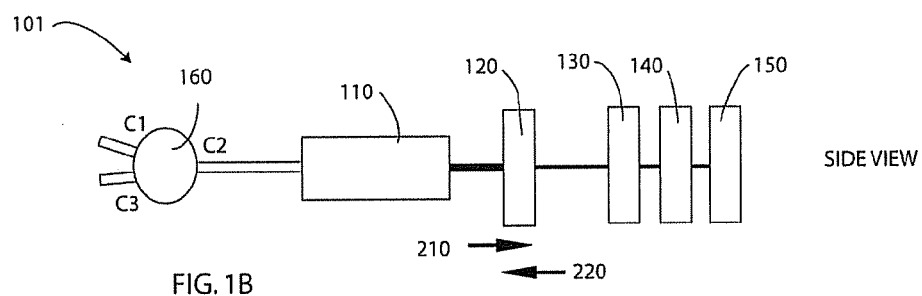
FIG. 1B  SIDE VIEW
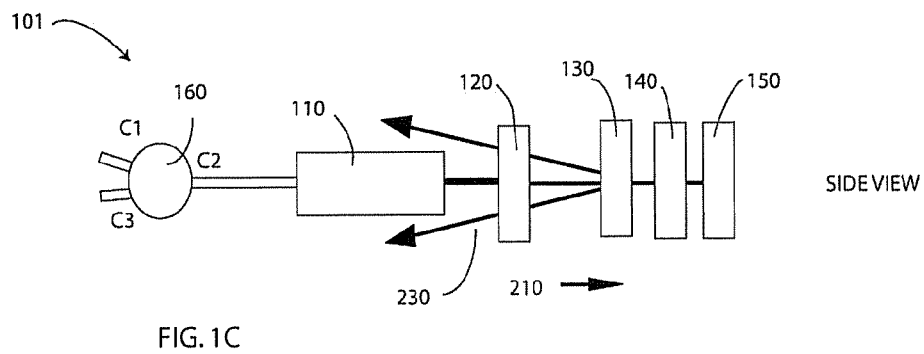
FIG. 1C  SIDE VIEW

OPTICAL WAVELENGTH FILTER

BACKGROUND

1. Field

The present subject matter relates generally to the field of fast optical filters, whose operation is wavelength dependent, especially for use as a wavelength selective device in an optical communication system.

2. Description of the Related Art

It is known in optical communications systems to use wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system.

There is a need in such systems to switch packets of optical information passing along one fiber to any of a number of other fibers, according to the wavelength of the optical signal. Such a switch is known as an optical filter or a wavelength selective device. A number of wavelength dependent filters have been developed using various characteristics of optical elements. There exists a need for a new optical, multi-pole, multi-way wavelength selective switch structure having a simple optical structure.

SUMMARY

In accordance with the present subject matter, a wavelength selective device with high stability, high wavelength precision, high efficiency and small form factor can be achieved.

An aspect of the present subject matter is directed to an optical wavelength selective device including a waveguide grating unit configured to separate input beam signals with different wavelengths into a plurality of output beam signals, each of which has a different wavelength span and is output from a different channel region of the waveguide grating unit; a polarization splitting unit configured to split the plurality of output beam signals output from the waveguide grating unit into a first polarized beam with a first polarization and a second polarized beam with a second polarization different from the first polarization; a birefringence control member configured to control the first polarized beam with the first polarization to undergo a different refractive effect than the second polarized beam with the second polarization when the first and second polarized beams pass through the birefringence control member under a first voltage applied thereto; and a reflection member configured to reflect the first and second polarized beams output from the birefringence control member to the birefringence control member.

According to an aspect of the present subject matter, the wavelength selective device may include an optical circulator including three optical ports, a first optical port being configured to input the input beam signals, a second optical port being connected to the waveguide grating unit through an optical medium, a third optical port being configured to output output beam signals.

According to an aspect of the present subject matter, the wavelength selective device may include a lens unit on an optical path between the waveguide grating unit and the polarization splitting unit.

According to an aspect of the present subject matter, the wavelength selective device may include an optical circulator including three optical ports, a first optical port being configured to input the input beam signals, a second optical port being connected to a lens assembly through an optical medium, a third optical port being configured to output output beam signals, wherein the lens assembly is provided on an optical path between the optical circulator and the waveguide grating unit, the lens assembly being configured to collimate and expand the input beam signals output from the second optical port of the optical circulator.

In the wavelength selective device according to an aspect of the present subject matter, the different wavelength span may be, but not limited to 25, 50, 100, 200, or 400 GHz.

In the wavelength selective device according to an aspect of the present subject matter, the waveguide grating unit may be a planar light wave circuit (PLC) unit.

In the wavelength selective device according to an aspect of the present subject matter, the polarization splitting member may be a square or wedge type birefringence crystal, Wollaston prisms, or Brewster windows.

In the wavelength selective device according to an aspect of the present subject matter, the birefringence control member is further configured to control the first polarized beam with the first polarization to undergo a same refractive effect as the second polarized beam with the second polarization when the first and second polarized beams pass through the birefringence control member under a second voltage applied thereto.

In the wavelength selective device according to an aspect of the present subject matter, the birefringence control member is a liquid crystal (LC) cell including a plurality of pixels, which are arranged so that each of the plurality of pixels is configured to receive one of the plurality of output beam signals output from the waveguide grating unit, through the polarization splitting unit, having a corresponding wavelength span. Meanwhile, each pixel may be regarded as receiving more than one beam as a beam is actually a continuous beam spanning, e.g., from 193.00 THz to 193.10 THz (i.e., from 1,552.52 nm to 1553.33 nm) in a 100 GHz spacing device.

In the wavelength selective device according to an aspect of the present subject matter, the plurality of pixels of the LC cell is independently controllable to apply the first voltage and the second voltage thereto.

In the wavelength selective device according to an aspect of the present subject matter, the LC cell is in a quarter wave condition with respect to the first and second polarized beams when the first voltage is applied thereto, while the LC cell is in substantially zero birefringence with respect to the first and second polarized beams when the second voltage is applied thereto.

In the wavelength selective device according to an aspect of the present subject matter, the LC cell and the reflective member are arranged such that, under the first voltage applied to the LC cell, the first polarized beam reflected from the reflective member has the second polarization when it is output from the LC cell, while the second polarized beam reflected from the reflective member has the first polarization when it is output from the LC cell, whereby the two reflected polarized beams propagate to the optical circulator through the polarization splitting unit and the waveguide grating unit.

In the wavelength selective device according to an aspect of the present subject matter, the LC cell and the reflective member are further arranged such that, under the second voltage applied to the LC cell, the first polarized beam reflected from the reflective member has the first polarization when it is output from the LC cell, while the second polarized beam reflected from the reflective member has the second polarization when it is output from the LC cell, whereby the two reflected polarized beams propagate wide off the optical circulator through the polarization splitting unit and the waveguide grating unit.

Another aspect of the present subject matter is directed to a method of selecting a light beam signal having a desired wavelength span out of light beam signals having various wavelengths, including: separating input beam signals with different wavelengths into a plurality of output beam signals using a waveguide grating unit, each of the plurality of output beam signals has a different wavelength span and is output from a different channel region of the waveguide grating unit; splitting, by a polarization splitting unit, the plurality of output beam signals output from the waveguide grating unit into a first polarized beam with a first polarization and a second polarized beam with a second polarization different from the first polarization; controlling, by a birefringence control member, the first polarized beam with the first polarization to undergo a different refractive effect than the second polarized beam with the second polarization when the first and second polarized beams pass through the birefringence control member under a first voltage applied thereto; and reflecting the first and second polarized beams output from the birefringence control member to the birefringence control member using a reflection member.

According to an aspect of the present subject matter, the method may include controlling, by the birefringence control member, the first polarized beam with the first polarization to undergo a same refractive effect as the second polarized beam with the second polarization when the first and second polarized beams pass through the birefringence control member under a second voltage applied thereto.

In the method according to an aspect of the present subject matter, the birefringence control member may be a liquid crystal (LC) cell including a plurality of pixels, the method further comprising arranging the plurality of pixels of the LC cell so that each of the plurality of pixels is configured to receive one of the plurality of output beam signals output from the waveguide grating unit, through the polarization splitting unit, having a corresponding wavelength span.

According to an aspect of the present subject matter, the method may include independently applying the first voltage or the second voltage to each of the plurality of pixels of the LC cell.

According to an aspect of the present subject matter, the method may include adjusting the LC cell to be in a quarter wave condition with respect to the first and second polarized beams when the first voltage is applied thereto, and adjusting the LC cell to be in substantially zero birefringence with respect to the first and second polarized beams when the second voltage is applied thereto.

According to an aspect of the present subject matter, the method may include arranging the LC cell and the reflective member such that, under the first voltage applied to the LC cell, the first polarized beam reflected from the reflective member has the second polarization when it is output from the LC cell, while the second polarized beam reflected from the reflective member has the first polarization when it is output from the LC cell, whereby the two reflected polarized beams propagate to the optical circulator through the polarization splitting unit and the waveguide grating unit.

According to an aspect of the present subject matter, the method may include arranging the LC cell and the reflective member such that, under the second voltage applied to the LC cell, the first polarized beam reflected from the reflective member has the first polarization when it is output from the LC cell, while the second polarized beam reflected from the reflective member has the second polarization when it is output from the LC cell, whereby the two reflected polarized beams propagate wide off the optical circulator through the polarization splitting unit and the waveguide grating unit.

Additional aspects and/or advantages of the present subject matter will be set forth in part in the description which follows and, in part, will be obvious from the description, or may be learned by practice of the present subject matter.

BRIEF DESCRIPTION OF THE DRAWINGS

These and/or other aspects and advantages of the present subject matter will become apparent and more readily appreciated from the following description of the embodiments, taken in conjunction with the accompanying drawings of which:

FIG. 1A is a top view of an optical wavelength filter in accordance with an embodiment of the present subject matter; and FIG. 1B and FIG. 1C are side views of the optical wavelength filter of FIG. 1A.

DETAILED DESCRIPTION

Figure 2A:
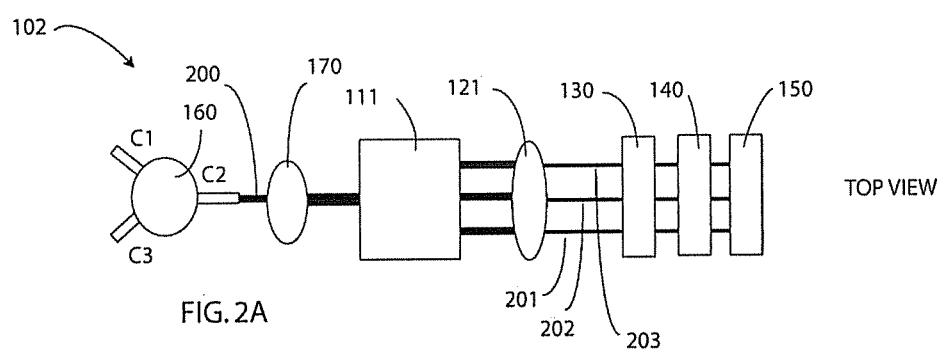
FIG. 2A is a top view of an optical wavelength filter in accordance with an embodiment of the present subject matter.

Reference will now be made in detail to embodiments of the present subject matter, examples of which are illustrated in the accompanying drawings, wherein like reference numerals refer to the like elements throughout. The embodiments are described below in order to explain the present subject matter by referring to the figures.

FIG. 1A is a top view of an optical wavelength filter 101 in accordance with a first embodiment of the present subject matter; and FIGS. 1B and 1C are side views of the optical wavelength filter 101 of FIG. 1A. Referring to FIG. 1A, the wavelength filter 101 includes a waveguide grating unit 110, an imaging lens unit 120, a polarization splitting member 130, a birefringence control member 140, a reflection member 150, and an optical circulator 160.

The circulator 160 has three ports: a first port C1, a second port C2, and a third port C3. An input light signal enters the first port C1 of the circulator 160, and is then transmitted to the first port C1 through an optical medium. While not limited thereto, an example of the optical medium includes an optic fiber connected to the first port C1 of the circulator 160. After the first port C1, the light signal propagates to the second port C2, and then propagates to the third port C3. By contrast, light signals are not transmitted through the reverse paths, such as from the second port C2 to the first port C1 and from the third port C3 to the second port C2.

The second port C2 of the circulator 160 is coupled to a waveguide grating unit 110. The input light transmitted to the second port C2 propagates to the waveguide grating unit 110.

While not limited thereto, the waveguide grating unit 110 can be made as an array waveguide grating. An arrayed waveguide grating is a device that is typically fiber-coupled.

The waveguide grating can separate or combine optical signals with different wavelengths, which is usually built as a planar light wave circuit (PLC), where the light from an input fiber first enters a multimode waveguide section, and then propagates through several single-mode waveguides to a second multimode section. Wavelength filtering is based on an interference effect and the different optical path lengths in the single-mode waveguides. Any frequency component of the input light propagates through all single-mode waveguides, which form a plurality of channels, and the output light in any channel results from the superposition (interference) of all these contributions of the frequency components.

After passing through the waveguide grating unit 110, light beams 201, 202 and 203 with different wavelengths are coming out from different positions (channels) of the waveguide grating unit 110. In FIG. 1A, three light beams 201, 202 and 203 are illustrated as an example. These light beams 201, 202 and 203 have different wavelengths from each other. The number of light beams is not limited to three, but can be one, two or more than three.

Coupled to the waveguide grating unit 110 is an imaging lens unit 120. Light beams coming out of the plurality of channels of the waveguide grating unit 110 propagate through the imaging lens unit 120. Proper imaging lens, either free space form or waveguide form, which can be integrated to the waveguide grating unit 110, is used to separate wavelength to focal plane. If the proper imaging lens is integrated into the waveguide grating unit 110, a separate imaging lens unit 120 may not be necessary.

Light beams coming from the imaging lens unit 120 propagate though a polarization splitting member 130. The polarization splitting member 130 is an element that splits incident light into two polarization components, which may be orthogonal to each other. The split polarization components are deviated from each other with a certain deviation angle. In other words, an incident light beam is split into a first polarized light beam having a first polarization and a second polarized light beam having a second polarization while passing the polarization splitting member 130. The first polarized light beam travels in a different direction from the second polarized light beam. The first and second polarizations can be orthogonal to each other.

Examples of the polarization splitting member 130 include a square or wedge type birefringent crystal, Wollaston prisms, and Brewster windows. However, any element, which is capable of splitting a light beam into two polarization components, which have different angles and/or positions, can be used for the polarization splitting member 130.

Light beams output from the polarization splitting member 130 enter into a birefringence control member 140. The birefringence control member 140 includes a plurality of pixels, each of which is aligned to a corresponding channel of the waveguide grating unit 110. Accordingly, a light beam from a channel of the waveguide grating unit 110 enters a corresponding pixel of the birefringence control member 140, while another light beam from another channel of the waveguide grating unit 110 enters another pixel of the birefringence control member 140.

The birefringence control member 140 is capable of changing birefringence by controlling an external parameter, such as an external voltage or current applied to a pixel of the birefringence control member 140. The pixels of the birefringence control member 140 can be independently controlled.

An example of the birefringence control member 140 is a liquid crystal (LC) cell having a plurality of pixels. The pixels of the LC cell can be arranged in such a way that a proper portion of a wavelength span of light is controlled by a single pixel. The wavelength span can be 25 GHz, 50 GHz, 100 GHz, 200 Ghz, or 400 GHz.

The light beams are then reflected from a reflection member 150. An example of the reflection member 150 is a mirror or a reflection plate. The mirror can be either located external to the birefringence control member 140 or integrated into the birefringence control member 140. If the reflection member 150 is integrated into the birefringence control member 140 and the birefringence control member 140 is a LC cell, the LC cell is a reflective type LC cell and a separate reflection member 150 may not be necessary. In FIG. 1A, the birefringence control member 140 is shown as a transmissive type only for the purpose of illustration.

The LC cell typically has two substrates facing each other with liquid crystal material disposed between them. In case the mirror is integrated into the LC cell, the mirror can be placed on an inner or outer surface of a substrate of the liquid crystal cell. Light beams pass through a first substrate of a LC cell and liquid crystal material before being reflected from a mirror, which is placed on an inner or outer surface of a second substrate of the LC cell.

The LC cell for the birefringence control member 140 could be, but not limited to, a homogeneously aligned nematic LC cell or homeotropically aligned LC cell. In the homogeneously aligned nematic LC cell, nematic liquid crystals are oriented parallel to the substrates, while in the homeotropic LC cell, nematic liquid crystals are oriented perpendicular to the substrates. When an external voltage is applied to the liquid crystals, the orientation of liquid crystals changes. For example, under the external voltage, the homogeneously aligned nematic liquid crystals become aligned perpendicular to the substrate, while the hometropically aligned nematic liquid crystals become aligned parallel to the substrates. As the liquid crystals are birefringent material, if the orientation of the liquid crystals changes, the degree of birefringence of the LC cell changes accordingly.

Light beams reflected from the reflection member 150 travel in the reverse direction to the circulator 160. The reflected light beams enter the second port C2 of the circulator 160, and come out from the third port C3. The third port C3 is coupled to an optic fiber to transmit the output light beams thereto.

FIGS. 1B and 1C are side views of the wavelength filter 101. The operation of the wavelength filter according to this embodiment will be explained with reference to the side views of the wavelength filter 101.

FIG. 1B shows the case that a first voltage is applied to the birefringence control member 140. The birefringence control member 140 has a first birefringence when the first voltage is applied. The first birefringence is the condition in which an incident light beam entering the birefringence control member 140 is reflected in a direction substantially parallel to the incident light beam. In other words, the reflected light beam propagates generally in the reverse direction of the incident light beam. FIG. 1B shows an incident direction 210, along which the incident light beams travel, and a reflection direction 220, along which the reflected light beams travel. When a first voltage is applied to the birefringence control member 140, the reflected direction 220 is substantially parallel to but in the opposite direction of the incident direction 210.

FIG. 1C shows the case that a second voltage is applied to the birefringence control member 140. The birefringence control member 140 has a second birefringence when the second voltage is applied. The second birefringence is the condition in which reflected light beam 230 diverges at different angles from the incident light beam. The reflected light beam 230 does not reach the circulator 160, and thus, there is no output from the third port C3 of the circulator 160.

As explained above regarding the polarization splitting member 130, a light beam is split into a first polarized light beam having a first polarization and a second polarized light beam having a second polarization while passing through the polarization splitting member 130. Due to the nature of a birefringence crystal of the polarization splitting member 130, the first and second polarized light beams experience different refractive effect while passing through the polarization splitting member 130. The different refractive effect eventually results in a convergence or divergence of the first and second polarized light beams.

For example, a first voltage can be a voltage value that allows the birefringence control member 140 to be in a quarter wave condition when applied to the birefringence control member 140. In the quarter wave condition, the first and second polarized light beams switch the polarizations when the light beams output from the birefringence control member 140 after reflected from the reflection member 150. In other words, when the beams output from the birefringence control member 140, the first polarized light beam has a second polarization, and the second polarized light beam has a first polarization. The reflected light beams again experience the different refractive effect of the polarization splitting member 130 while passing through the polarization splitting member 130 in the reverse direction, but this effect works in the opposite way, making the reflected light beams parallel to the incident light beams.

For another example, a second voltage can be a voltage value that allows the birefringence control member 140 to have no birefringence when applied to the birefringence control member 140. When the second voltage applies, the first and second polarized light beams experience no polarization change while passing through the birefringence control member 140 after reflected from the reflection member 150. In this case, however, the different refractive effect of the polarization splitting member 130 is amplified during the reflected light beams pass through the polarization splitting member 130 in the reverse direction, eventually making the first and second polarized light beams diverge from each other.

Figure 2B:
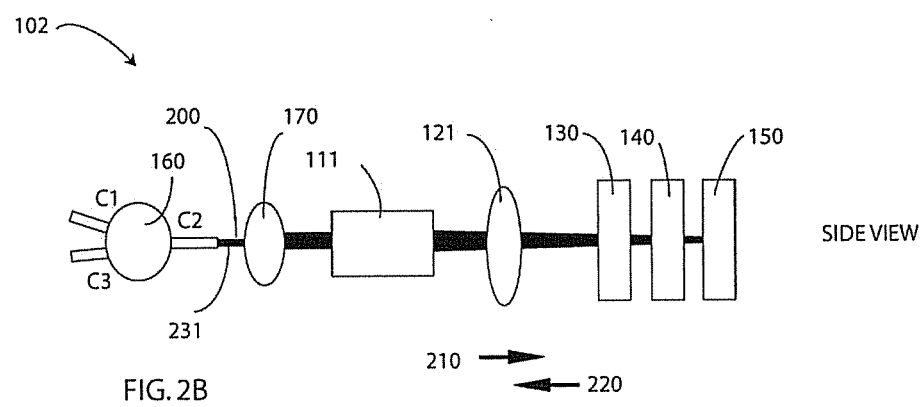
FIG. 2B and FIG. 2C are side views of the optical wavelength filter of FIG. 2A.
Figure 2C:
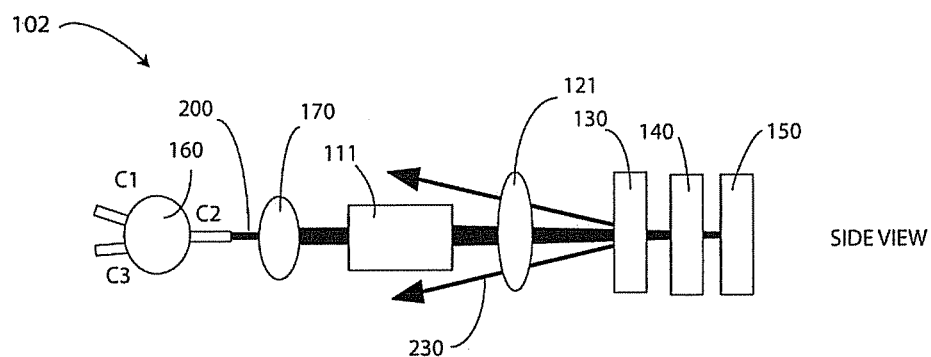

FIGS. 2A, 2B and 2C illustrate a wavelength filter 102 according to an embodiment of the present subject matter. The operation principle of the wavelength filter 102 is substantially the same as that of the wavelength filter 101 as shown in FIGS. 1A, 1B and 1C. FIG. 2A is a top view of the wavelength filter 102 in accordance with an embodiment of the present subject matter, and FIGS. 2B and 2C are side views of the wavelength filter 102.

The wavelength filter 102 further includes a lens assembly 170. Output light from circulator 160, which is an input light 200, is properly collimated and expanded while passing through the lens assembly 170. The lens assembly 170 can have one lens or more than one lens. The lens assembly 170 may be telecentric.

The wavelength filter 102 includes a grating unit 111, instead of the waveguide grating unit 110 of the wavelength filter 101. The grating unit 111 can include a reflective or a transmissive grating. The structures shown in FIGS. 2A, 2B and 2C include a transmissive type grating, but if the wavelength filter 102 includes a reflective type grating unit 111, the elements such as imaging lens unit 121 and birefringence control member 140, which are arranged on the right side of the grating unit 111, are disposed in front of the grating unit 111 but with proper angle so as to properly receive output light from the grating unit 111.

Passing through the grating unit 111, light is separated into a plurality of light beams 201, 202 and 203 having different wavelengths. The light beams 201, 202 and 203 are coming from different positions (channels) of the grating unit 111.

The light beams from the grating unit 111 pass through an imaging lens unit 121. The imaging lens unit 121 can include more than one lens assembly. The lens of the imaging lens unit 121 can be spherical, aspherical, cylindrical or combination of thereof.

Light beams from the imaging lens unit 121 propagate though a polarization splitting member 130, and each of the light beams is spit into two light beams having orthogonal polarizations (first polarized and second polarized light beams). The polarization splitting member 130 can include either square or wedge type birefringent crystal.

Light beams from the polarization splitting member 130 pass through a birefringence control member 140. The birefringence control member 140 includes a plurality of pixels, each of which is aligned to the channel of the grating unit 111. Accordingly, a light beam from a channel of the grating unit 111 enters a pixel of the birefringence control member 140, while another light beam from another channel of the grating unit 111 enters another pixel of the birefringence control member 140.

The birefringence control member 140 is capable of changing birefringence by an external parameter, such as an external voltage or current applied to the pixel of the birefringence control member 140. The pixels of the birefringence control member are independently controlled.

One example of the birefringence control member 140 is a liquid crystal (LC) cell having a plurality of pixels. The pixels of the LC cell are typically arranged such a way that proper portion of wavelength span of light is controlled by one pixel. In optical communication application, typically a wavelength span of 25 GHz, 50 GHz, 100 GHz, 200 Ghz, or 400 GHz is used.

The light beams are, then, reflected from a reflection member 150. An example of the reflection member 150 can be a mirror or a reflection plate. The mirror can be located external to the liquid crystal cell or could be integrated into the liquid crystal cell.

As known in the art, the LC cell has two substrates facing each other, and liquid crystal material is disposed between the two substrates. If the mirror is integrated into the LC cell, the mirror can be placed in an inner or outer surface of a substrate of the liquid crystal cell. Specifically, light beams pass through a first substrate of a LC cell and liquid crystal material, and then are reflected from a mirror placed in an inner or outer surface of a second substrate of the liquid crystal cell.

Light beams reflected from the reflection member 150 travel in reverse direction till the light beams reach the circulator 160. The reflected beams enter the second port C2 of the circulator 160, but exit through the third port C3, instead of the first port C1, and then are couples to the other optic fiber.

FIGS. 2B and 2C shows side views of the wavelength filter 102. As the operation principle of the wavelength filter 102 is the same as the operation principle of the wavelength filter 101 shown in FIGS. 1A, 1B and 1C.

FIG. 2B shows the case that a first voltage is applied to the birefringence control member 140. The birefringence control member 140 has a first birefringence, if the first voltage is applied. The first birefringence is the condition, in which an incident light beam entering the birefringence control member 140 is reflected substantially parallel to the incident light beam. Therefore, the reflected light beam propagates in the reverse direction of the incident light beam. FIG. 2B shows an incident direction 210, along which the incident light beams 200 travel, and a reflection direction 220, along which the reflected light beams 231 travel. When a first voltage is applied to the birefringence control member 140, the reflected direction 220 is substantially parallel to but in the reverse direction of the incident direction 210, and the reflected light beams 230 enters the second port C2 of the circulator 160, but exit through the third port C3.

FIG. 2C shows the case that a second voltage is applied to the birefringence control member 140. The birefringence control member 140 has a second birefringence, if the second voltage is applied. The second birefringence is the condition, in which reflected light beam 230 diverges in different angles from the incident light beam 200. Therefore, the reflected light beam 230 cannot reach the circulator 160, and there is no output in the third port C3 of the circulator 160.

Figure 2D:
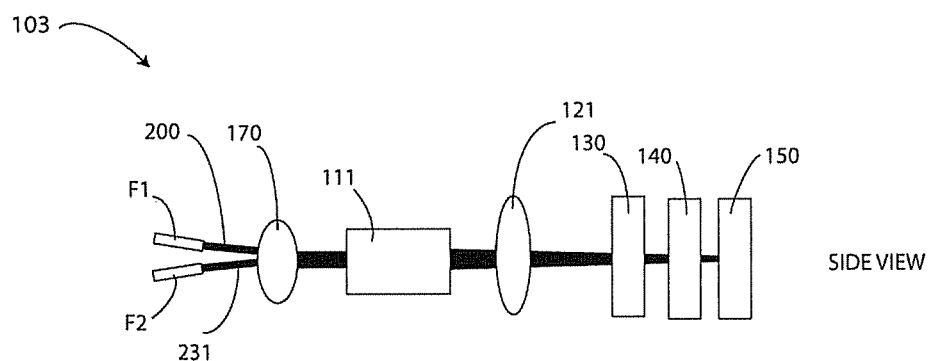
FIG. 2D schematically illustrates the case that a first voltage is applied to a birefringence control member of the optical wavelength filter shown in FIG. 2A.

The reflected light beams can be also coupled to an output fiber directly. FIG. 2D illustrate a wavelength filter 103, which is still another embodiment of the present invention. The structure of the wavelength filter 103 is substantially the same as the structure of the wavelength filter 102, except that the wavelength filter 103 does not have a circulator. In the wavelength filter 103, an input fiber F1 and an output fiber F2 are disposed in front of the lens assembly 170. Input light 200 coming out of the input fiber F1 enters the lens assembly 170.

FIG. 2D shows the case that a first voltage is applied to the birefringence control member 140. The birefringence control member 140 has a first birefringence. As explained above referring to FIG. 2B, an incident light beam entering the birefringence control member 140 is reflected substantially parallel to the incident light beam if the birefringence control member 140 has the first birefringence. In the wavelength filter 103, however, the reflected beam 231 is slightly deflected from the input light 200.

The direction of the reflected light beam 231 can be adjusted in order to make the reflected light beam 231 reach the output fiber F2. This adjustment of the direction of the reflected light beam 231 can be performed by tilting a mirror in the reflection unit 150. The output fiber can have a separate collimating lens as well.

If a second voltage is applied to the birefringence control member 140 of the wavelength filter 103, the birefringence control member 140 has a second birefringence. With the same principle as explained referring to FIG. 2C, reflected light beam diverges in different angles from the incident light beam 200. Therefore, the reflected light beam cannot reach the output fiber F2.

Figure 3A:
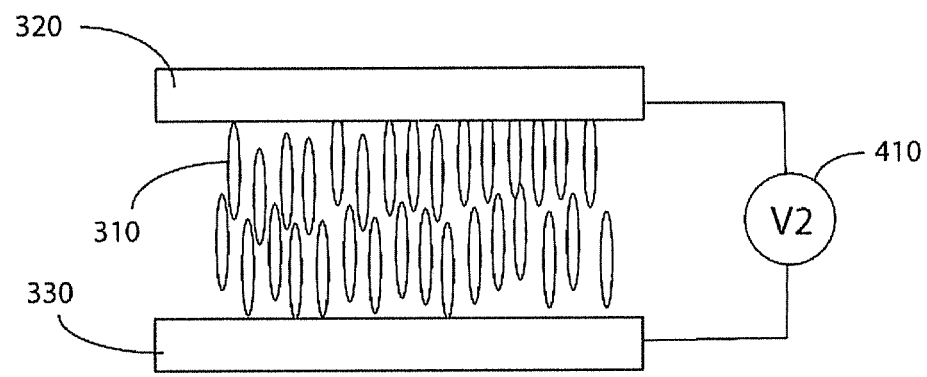
FIGS. 3A and 3B illustrate an exemplary homeotropic liquid crystal cell used as a birefringence control member according to the embodiments of the present subject matter shown in FIGS. 1A through 2D.

FIG. 3A illustrates a state when a second voltage V2 is applied to the homeotripic liquid crystal cell. In the structure shown in FIG. 3A, the magnitude of the second voltage V2 is zero, and the liquid crystals 310 are oriented perpendicular to the substrates 320 and 330. In this state, light traveling from the first substrate 320 to the second substrate 330 experiences no birefringence effect.

Figure 3B:
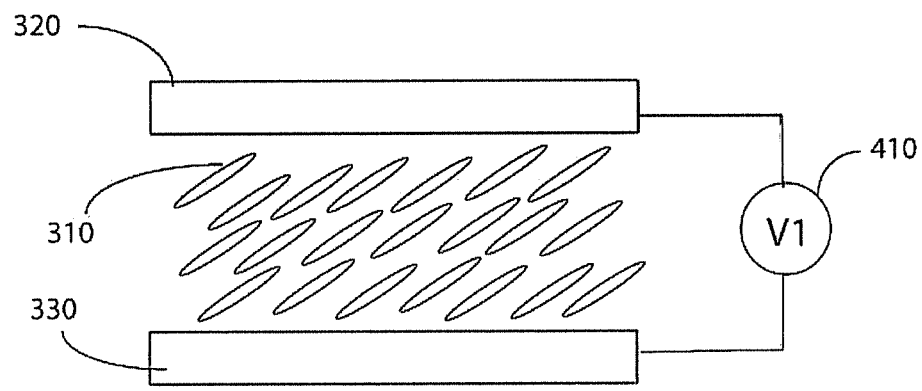

FIG. 3B shows another state when a first voltage V1 is applied to the homeotropic liquid crystals cell. At the first voltage V1, the liquid crystals 310 are tilted in a direction. In this state, the first optic axis 311 is aligned at a direction that is tiled from the first and second substrates 320 and 330. In this state, light traveling from the first substrate 320 to the second substrate 330 experiences a birefringence effect. The magnitude of the birefringence effect depends on the tilt angle of the first optic axis 311 of the liquid crystals 310.

Because the tilt angle of the liquid crystals 310 changes depending on the magnitude of the voltage applied to the liquid crystals 310, the homeotropic liquid crystals cell can be used for the birefringence control member 140 of the wavelength filters 101 and 102. FIGS. 3A and 3B show an exemplary homeotropic liquid crystal (LC) cell, which can be adapted into the birefringence control member 140 of the wavelength filter 101, 102 as shown in FIGS. 1, 2A and 2B.

The homeotropic LC cell includes a first substrate 320 and a second substrate 330. A first electrode layer 321 is formed on an inner surface of the first substrates 320, and a second electrode layer 331 is formed on an inner surface of the second substrate 330. A first alignment layer 322 is formed on the first electrode layer 321, and a second alignment layer 332 is formed on the second electrode layer 331.

The first and second alignment layers 322, 332 are capable of aligning liquid crystals 310 perpendicular to the substrates 320, 330. There are materials known in the art that can be used for the alignment layers 322, 332.

In case the input light beam 121 is supposed to enter to the first substrate 320, the electrode layer 321 is formed of a transparent conductive material, such as indium tin oxide (ITO), Al-doped zinc oxide (AZO) and Zn-doped indium oxide (IZO). Here, the transparent conductive material has transparency at a given wavelength of the input light beam.

If the reflection member 113 is integrated into the homeotropic LC cell, the second electrode layer 331 can function as an electrode layer as well as a reflection layer. In this case, the second electrode layer 331 can be made of a nontransparent conductive material, which has a high reflection at a given wavelength of the input light beam. Alternatively, a separate reflection layer can be formed between the second alignment layer 332 and the second electrode layer 331, or between the second electrode layer 332 and the second substrate 330.

Nematic liquid crystals 310 are disposed between the first and second alignment layers 322 and 332. The first and second electrode layers 321 and 331 are connected to an external voltage source 410. While described as external, it is understood that the voltage can be internal to the control member 112, such as where the member 112 includes a battery and/or voltage is generated internally.

Figure 3C:
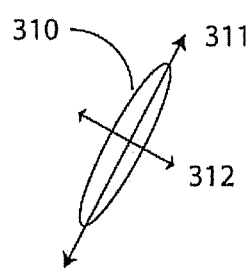
FIG. 3C is an exaggerated view of a liquid crystal having two optic axes used as a birefringence control member according to the embodiments of the present subject matter shown in FIGS. 1A through 2D.

FIG. 3C shows an exaggerated view of a liquid crystal 310 having two optic axes. The liquid crystal 310 has a first refractive index for light oscillating along a first optic axis 311, and a second refractive index for light oscillating along a second optic axis 312. Due to this characteristic, the liquid crystal 310 shows a birefringence, which can be identified by the difference between the first and second refractive indices. For sake of description, the orientation of the liquid crystal 310 is defined as the direction of the first optic axis 311.

In the homeotropic LC cell, liquid crystals 310 are oriented perpendicular to the first and second substrates 320 and 330 in the absence of an external voltage. In other words, the first optic axis 311 of the liquid crystals 310 is aligned perpendicular to the first and second substrates 320 and 330.

FIG. 3A illustrates that a first voltage V1 is applied to the homeotropic LC cell. In the structure shown in FIG. 3A, the first voltage V1 is zero, and the liquid crystals 310 are oriented perpendicular to the substrates 320 and 330. In this state, light traveling from the first substrate 320 to the second substrate 330 experiences no birefringence effect.

FIG. 3B shows that a second voltage V2 is applied to the homeotropic LC cell. If the second voltage V2 is non-zero, the liquid crystals 310 may be tilted in a certain direction at the second voltage V2. In this state, the first optic axis 311 is aligned at a direction that is not perpendicular to the first and second substrates 320 and 330. In this state, light traveling from the first substrate 320 to the second substrate 330 experiences a birefringence effect. The magnitude of the birefringence effect depends on the tilt angle of the first optic axis 311 of the liquid crystals 310.

Since the tilt angle of the liquid crystals 310 changes depending on the magnitude of the voltage applied to the liquid crystals 310, the homeotropic LC cell can be used for the birefringence control member 140 of the wavelength filter 101, 102.

In addition to the homeotropic LC cell as used in an embodiment of the present subject matter as illustrated in FIGS. 3A-3C, it should be appreciated that within the scope of the present subject matter, the homeotropic LC cell can be replaced with an In-Plane Switching (IPS) mode LC cell or a Blue Phase mode LC cell, both of which have zero birefringence when no external voltage/current is applied thereto and have nonzero birefringence when an external voltage/current is applied thereto. By using the homeotropic LC cell, IPS mode LC cell, or Blue Phase mode LC cell in combination with a square or wedge type birefringent crystal, Wollaston prisms, and Brewster windows, for example, it is possible to significantly enhance the stability and accuracy or speed of the wavelength filter and significantly reduce the form factor of the wavelength filter.

Although a few embodiments of the present subject matter have been shown and described, it would be appreciated by those skilled in the art that changes may be made in this embodiment without departing from the principles and spirit of the present subject matter, the scope of which is defined in the claims and their equivalents.

What is claimed is:

1. An optical wavelength selective device comprising:
 a waveguide grating unit which separates input beam signals with different wavelengths into a plurality of output beam signals, each of which has a different wavelength span and is output from a different channel region of the waveguide grating unit;
 a polarization splitting unit which splits each of the plurality of output beam signals output from the waveguide grating unit into a first polarized beam with a first polarization and a second polarized beam with a second polarization different from the first polarization;
 a birefringence control member which controls each of the first polarized beam with the first polarization to undergo a different refractive effect than the second polarized beam with the second polarization when the first and second polarized beams pass through the birefringence control member under a first voltage applied thereto; and
 a reflection member which reflects the first and second polarized beams output from the birefringence control member back to the birefringence control member.

2. The optical wavelength selective device according to claim 1, further comprising an optical circulator including a first optical port being into which is input the input beam signals, a second optical port connected to the waveguide grating unit through an optical medium, and a third optical port being to output the reflected beams reflected from the reflection member via the birefringence control member, the polarization splitting unit, and the waveguide grating unit.

3. The optical wavelength selective device according to claim 1, further comprising a lens unit in an optical path between the waveguide grating unit and the polarization splitting unit.

4. The optical wavelength selective device according to claim 3, further comprising an optical circulator including a first optical port being into which is input the input beam signals, a second optical port connected to the lens assembly through an optical medium, and a third optical port to output the reflected beams reflected from the reflection member via the birefringence control member, the polarization splitting unit, and the waveguide grating unit,
 wherein the lens assembly is provided on an optical path between the optical circulator and th e waveguide grating unit, and
 the lens assembly collimates and expands the input beam signals output from the second optical port of the optical circulator.

5. The optical wavelength selective device according to claim 1, wherein the different wavelength span is selectable between 25, 50, 100, 200, and 400 GHz.

6. The optical wavelength selective device according to claim 1, wherein the waveguide grating unit is a planar light wave circuit (PLC) unit.

7. The optical wavelength selective device according to claim 1, wherein the polarization splitting member is a square or wedge type birefringence crystal, Wollaston prisms, or Brewster windows.

8. The optical wavelength selective device according to claim 1, wherein the birefringence control member further controls the first polarized beam with the first polarization to undergo a same refractive effect as the second polarized beam with the second polarization when the first and second polarized beams pass through the birefringence control member under a second voltage applied thereto.

9. The optical wavelength selective device according to claim 8, wherein the birefringence control member is a liquid crystal (LC) cell including a plurality of pixels,] each of the plurality of pixels receives one of the plurality of output beam signals output from the waveguide grating unit, through the polarization splitting unit, having a corresponding wavelength span.

10. The optical wavelength selective device according to claim 9, wherein the plurality of pixels of the LC cell is independently controllable to apply the first voltage and the second voltage thereto.

11. The optical wavelength selective device according to claim 10, wherein the LC cell is in a quarter wave condition with respect to the first and second polarized beams when the first voltage is applied thereto, while the LC cell is in substantially zero birefringence with respect to the first and second polarized beams when the second voltage is applied thereto.

12. The optical wavelength selective device according to claim 11, wherein the LC cell and the reflective member are arranged such that, under the first voltage applied to the LC cell, the first polarized beam reflected from the reflective member has the second polarization when it is output from the LC cell, while the second polarized beam reflected from the reflective member has the first polarization when it is output from the LC cell, whereby the two reflected polarized beams propagate to the optical circulator through the polarization splitting unit and the waveguide grating unit.

13. The optical wavelength selective device according to claim 12, wherein the LC cell and the reflective member are further arranged such that, under the second voltage applied to the LC cell, the first polarized beam reflected from the reflective member has the first polarization when it is output from the LC cell, while the second polarized beam reflected from the reflective member has the second polarization when it is output from the LC cell, whereby the two reflected polarized beams propagate wide of the optical circulator through the polarization splitting unit and the waveguide grating unit.

14. A method of selecting a light beam signal having a desired wavelength span out of light beam signals having various wavelengths, comprising:

separating input beam signals with different wavelengths into a plurality of output beam signals using a waveguide grating unit, each of the plurality of output beam signals having a different wavelength span and is output from a different channel region of the waveguide grating unit;

splitting, by a polarization splitting unit, the plurality of output beam signals output from the waveguide grating unit into a first polarized beam with a first polarization and a second polarized beam with a second polarization different from the first polarization;

controlling, by a birefringence control member, the first polarized beam with the first polarization to undergo a different refractive effect than the second polarized beam with the second polarization when the first and second polarized beams pass through the birefringence control member under a first voltage applied thereto; and reflecting the first and second polarized beams output from the birefringence control member back to the birefringence control member using a reflection member.

15. The method according to claim 14, further comprising controlling, by the birefringence control member, the first polarized beam with the first polarization to undergo a same refractive effect as the second polarized beam with the second polarization when the first and second polarized beams pass through the birefringence control member under a second voltage applied thereto.

16. The method according to claim 15, wherein the birefringence control member is a liquid crystal (LC) cell including a plurality of pixels, each of the plurality of pixels receiving one of the plurality of output beam signals output from the waveguide grating unit, through the polarization splitting unit, having a corresponding wavelength span.

17. The method according to claim 16, further comprising independently applying the first voltage or the second voltage to each of the plurality of pixels of the LC cell.

18. The method according to claim 17, further comprising arranging the LC cell to be in a quarter wave condition with respect to the first and second polarized beams when the first voltage is applied thereto, and arranging the LC cell to be in substantially zero birefringence with respect to the first and second polarized beams when the second voltage is applied thereto.

19. The method according to claim 18, further comprising arranging the LC cell and the reflective member such that, under the first voltage applied to the LC cell, the first polarized beam reflected from the reflective member has the second polarization when it is output from the LC cell, while the second polarized beam reflected from the reflective member has the first polarization when it is output from the LC cell, whereby the two reflected polarized beams propagate to the optical circulator through the polarization splitting unit and the waveguide grating unit.

20. The method according to claim 19, further comprising arranging the LC cell and the reflective member such that, under the second voltage applied to the LC cell, the first polarized beam reflected from the reflective member has the first polarization when it is output from the LC cell, while the second polarized beam reflected from the reflective member has the second polarization when it is output from the LC cell, whereby the two reflected polarized beams propagate wide off the optical circulator through the polarization splitting unit and the waveguide grating unit.

* * * * *

UNITED STATES PATENT AND TRADEMARK OFFICE
CERTIFICATE OF CORRECTION

Page 1 of 1

PATENT NO.         : 8,619,216 B1
APPLICATION NO.    : 13/491029
DATED              : December 31, 2013
INVENTOR(S)        : Seong Woo Suh It is certified that error appears in the above-identified patent and that said Letters Patent is hereby corrected as shown below:

In the Claims:

In claim 4 (col. 12, line 4), "th e" should read -- the --.

In claim 9 (col. 12, line 28), ",] each of the" should read -- , each of the --.

Signed and Sealed this
Eighteenth Day of March, 2014

Michelle K. Lee
*Deputy Director of the United States Patent and Trademark Office*